D. SMITH.
Milk-Coolers.

No. 144,572. Patented Nov. 11, 1873.

Witnesses:
Franck L. Durand
C. L. Evert

Inventor.
David Smith
per Alexander Mator
Attorneys.

UNITED STATES PATENT OFFICE

DAVID SMITH, OF JAMESTOWN, NEW YORK.

IMPROVEMENT IN MILK-COOLERS.

Specification forming part of Letters Patent No. 144,572, dated November 11, 1873; application filed May 14, 1873.

*To all whom it may concern:*

Be it known that I, DAVID SMITH, of Jamestown, in the county of Chautauqua and in the State of New York, have invented certain new and useful Improvements in Milk-Cooler; and do hereby declare that the following is a full, clear, and exact description thereof, reference being had to the accompanying drawings and to the letters of reference marked thereon making a part of this specification.

The nature of my invention consists in the construction of a milk-cooler, as hereinafter more fully set forth.

In order to enable others skilled in the art to which my invention appertains to make and use the same, I will now proceed to describe its construction and operation, referring to the annexed drawing, in which—

Figure 1:
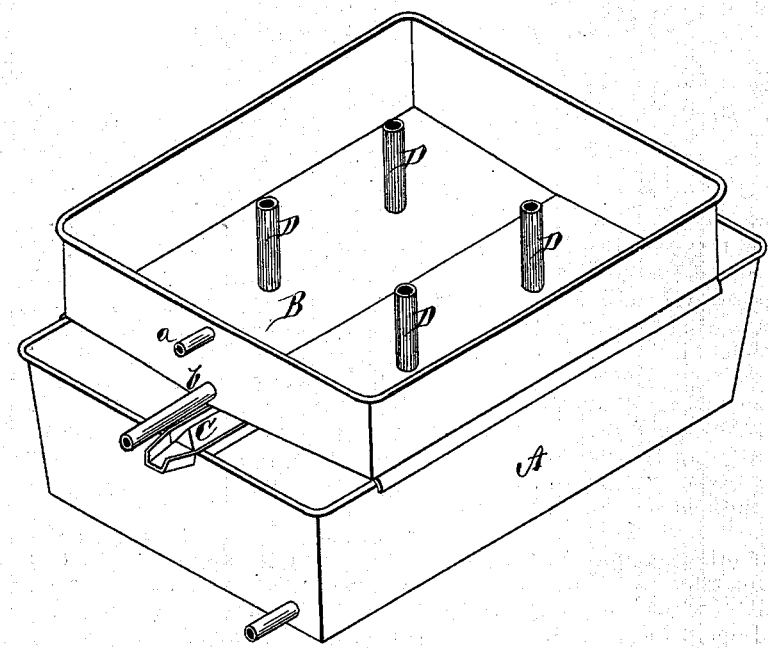
Figure 2:
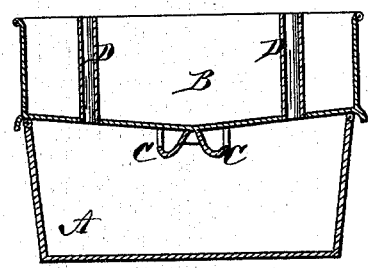

Figure 1 is a perspective view of a milk-pan, with my cover on top, and Fig. 2 is a transverse vertical section of the same.

It has always heretofore been thought that the sooner the animal heat could be got out of milk the better; but experience has taught me that this is not correct. The animal heat is the life of the milk, and is absolutely necessary to the chemical action which causes the cream to rise to the surface. When the heat is all out of the milk it stands nearly still, and the cream rises very slow; and if the milk is too cold it will stand several days and turn blue with but a small scum of cream, because there has not been the chemical action required.

In the drawing, A represents a milk-pan of any desired construction, on top of which is placed another pan, B, forming a cover for the milk-pan. This cover or top pan, B, may be made so as to completely cover the milk-pan; but I prefer to make it somewhat shorter, leaving a suitable space at each end for the purpose of admitting light and air to the milk. The bottom of the cover B is made inclined from both sides toward the center, so as to cause the sweat or condensation to collect along the center ridge and then drop into a trough or troughs, C, arranged under the same. A series of vertical tubes, D D, of any suitable shape and of any desired number, are arranged in the cover B, to allow the hot air and steam from the milk to escape. Water is put into the cover B, and ice also, if so desired, to cool the milk in the pan A from the top; or a running stream may be kept up, the water passing into the cover at any desired point, and out through the outlet-tube $a$. $b$ is an outlet-tube, to draw off all the water in the cover.

Having thus fully described my invention, what I claim as new, and desire to secure by Letters Patent, is—

The combination of the milk-pan A, the cooling-pan B with bottom convex on its under side, the pipes D D, and condensing-trough C, all constructed and used as and for the purposes set forth.

In testimony that I claim the foregoing I have hereunto set my hand this 24th day of April, 1873.

DAVID SMITH.

Witnesses:
HENRY O. LAKIN,
J. LAMBERT INGERSOLL.